UNITED STATES PATENT OFFICE.

WILLIAM GEORGE ABBOTT, JR., OF WILTON, NEW HAMPSHIRE.

WATERPROOFING COMPOSITION AND METHOD OF MAKING SAME.

1,395,885.  Specification of Letters Patent.  Patented Nov. 1, 1921.

No Drawing.  Application filed September 23, 1918. Serial No. 255,299.

*To all whom it may concern:*

Be it known that WILLIAM G. ABBOTT, Jr., a citizen of the United States, and resident of Wilton, in the county of Hillsborough and State of New Hampshire, has invented new and useful Improvements in Waterproofing Compositions and Methods of Making Same, of which the following is a specification.

This invention relates to waterproofing compositions and more particularly to compositions for impregnating leather, fabrics, etc., and to the method of making same.

The principal objects of the invention are to provide a composition which may be easily and quickly applied and which will be permanent and unchanging after application. A secondary object is to provide a composition which will permit the material to which it is applied to be polished after it has been applied.

The basic ingredients for my improved composition and the method of compounding it are lead acetate and a vegetable or animal oil or fat, particularly those classes of oils and fats known as glycerids. To these ingredients or to the compositions formed by combining them various miscible substances such as paraffin, or animal or vegetable waxes, resins, and gums, may be added, to impart various physical properties to the final composition. These ingredients are combined by heating the oil or fat to approximately 100° C. or somewhat above the melting point and then gradually adding the lead acetate. The lead acetate combines rapidly with the oil, giving off a certain amount of acetic acid gas, thus producing ebullition. The temperature is then raised to approximately 150° C. for a short time to complete the reaction. The resuting compound is a hard tenacious material which is useful for many purposes as will hereinafter appear. The hardness can be increased by adding more lead acetate until the saturation point is reached, after which further additions of lead acetate will not combine. When using a thin fluid oleate, for example, the oleate unites with the lead acetate to form a mass which is tough and elastic when cold and which is viscid even when heated to a fairly high temperature. It does not change or harden with age, is insoluble in water, and repels water actively. It blends with paraffin, carnauba, candelilla, ceresin, montan and other animal and vegetable waxes. It can be compounded with resin, rubber, gutta percha, balata and other gums, to make same more plastic and water repellent.

Solutions of the aforesaid basic ingredients can be made in benzol, naphtha, gasolene, kerosene, carbon tetrachlorid, etc., either alone or together with one or more waxes or gums such as referred to above In this form the composition is readily applicable to leather, fabrics, imitation leather, etc. It fills the porosities of the material to which it is applied to such extent as to render the material waterproof, lubricate the fibers, prevent crumbling or disintegration, and afford an attractive anti-friction surface. The material and its mixtures have a wide variety of uses as, *e. g.*, on shoes, saddles, harness, leather bags, tents, canvas covers, waterproof clothing, etc.

My improved composition in its various forms can be applied in various ways as, *e. g.*, by dipping, calendering or painting at temperatures which permit easy penetration.

One specific embodiment of my improved composition comprises equal parts of lead acetate and the oil or fat, as, *e. g.*, oleate or stearate. The oil is first heated to a temperature just above 100° C. which drives off any water that it may contain. The lead acetate is then added slowly and the gas generated from the reaction allowed to escape, after which the temperature is raised to say 150° C. The resulting composition is usually high viscid and other suitable material or materials may be added to lower the viscosity. If such material is added it is preferably added immediately after the addition of the lead acetate in order to reduce foaming.

Another specific embodiment comprises equal parts of lead acetate, double pressed red oil and paraffin wax, the latter preferably having a low melting point. The red oil, which is an animal oil made from offal, bones, etc., is heated and the acetate added as before. As soon as the composition begins to foam several small pieces of wax are added, before adding the other ingredients. The wax forms a molten layer over the surface of the liquid for a short time thus preventing foaming. When employing paraffin wax the composition can be brushed on leather fabrics, etc., and by keeping the temperature of the leather fabric or other material at about 70° C. the composition is absorbed rapidly and completely.

Modified compositions may be made by substituting for a part or all of the paraffin wax one or more other waxes, such as carnauba, candelilla, ceresin, montan, or other animal or vegetable wax, or resin, rubber, gutta percha, balata or other gum.

Another specific form of my improved composition comprises twenty pounds of lead acetate, twenty pounds of oil (red oil, e. g.), six pounds of paraffin wax and four pounds of a harder wax (carnauba wax, e. g.)

To apply the improved composition the compound is preferably dissolved in naphtha, gasolene, or other hydrocarbon or suitable solvent. For example, a composition comprising two pounds of lead acetate, two pounds of double pressed red oil and two pounds of paraffin wax may be dissolved in a mixture of one pint of kerosene, seven pints of naphtha, and enough carbon-tetrachlorid to render the solution non-inflammable.

A still further embodiment of the invention comprises equal amounts of lead acetate, red oil, beeswax, and paraffin wax, a small amount of carnauba wax, enough kerosene and naphtha to give the composition the desired power of penetration, enough carbontetrachlorid to render the composition non-inflammable, and any desired amount of resin, rubber and gutta percha.

In each embodiment of the present invention the lead acetate does not remain inert but chemically combines with the oil. The resulting product is a viscid waterproof material which is non-hardening with age, which will mix with a large range of materials, and which can be almost completely absorbed by the fabric or leather to which it is applied. Thus the composition is particularly effective in treating artificial leather such as is used in automobile tops.

Owing to the high viscosity and high melting point the composition does not sweat or run when exposed to direct sunlight or corresponding temperatures. The paraffin wax has a tendency to reduce the melting point and increase the fluidity.

Addition of a harder wax such as carnauba or candelilla wax facilitates polishing the material to which the composition is applied. This is of particular value in treating boots and shoes and automobile tops and cushions. Addition of resin produces a harder and stickier compound; while rubber, gutta percha or balata affords a composition which is tougher and more tenacious but no harder.

I claim:

1. The method of treating glycerids to produce a viscous water resistant composition, which consists in adding lead acetate to the substance to be treated, at temperatures in excess of 100° C.

2. The method of treating glycerids, to produce a viscous water-resistant composition, which consists in adding lead acetate to the substance to be treated at a preliminary temperature slightly in excess of 100° C., thereafter raising the temperature to about 150° C.

3. The viscous water-resistant composition produced by treating glycerids with lead acetate at temperatures in excess of 100° C.

4. The viscous water-resistant composition, produced by treating glycerids with lead acetate at a preliminary temperature slightly in excess of 100° C. and thereafter at a temperature about 150° C.

5. The method of treating glycerids to produce a viscous water-resistant composition which consists in chemically saturating the substance to be treated, with lead acetate, at temperatures in excess of 100° C.

6. The method of treating glycerids to produce a viscous water-resistant composition which consists in chemically saturating the substance to be treated, with lead acetate at a preliminary temperature slightly in excess of 100° C., thereafter at a temperature about 150° C.

7. The viscous water-resistant composition produced by chemically saturating glycerids with lead acetate at temperatures in excess of 100° C.

8. The viscous water-resistant composition produced by chemically saturating glycerids with lead acetates, at a preliminary temperature slightly in excess of 100° C., thereafter at a temperature about 150° C.

9. The method of treating glycerids to produce a water-resistant composition, which consists in adding lead acetate to the substance to be treated, at temperatures in excess of 100° C., and adding to the composition waxy substances miscible therein.

10. The water-resistant composition produced by treating glycerids with lead acetate at temperatures in excess of 100° C., and adding thereto waxy substances miscible therein.

Signed by me at Washington, D. C., this eleventh day of September, 1918.

WILLIAM GEORGE ABBOTT, Jr.